United States Patent
Morozov et al.

(10) Patent No.: US 9,829,617 B2
(45) Date of Patent: Nov. 28, 2017

(54) POLYMER-SMALL MOLECULE FILM OR COATING HAVING REVERSE OR FLAT DISPERSION OF RETARDATION

(71) Applicant: LIGHT POLYMERS B.V., Amsterdam (NL)

(72) Inventors: Evgeny Morozov, Burlingame, CA (US); Valeriy Kuzmin, San Bruno, CA (US); Sergey Fedotov, Dzerzhinsk (RU)

(73) Assignee: LIGHT POLYMERS HOLDING, Cayman Islands (KY)

( * ) Notice: Subject to any disclaimer, the term of this patent is extended or adjusted under 35 U.S.C. 154(b) by 0 days.

(21) Appl. No.: 14/590,511

(22) Filed: Jan. 6, 2015

(65) Prior Publication Data

US 2016/0131812 A1    May 12, 2016

Related U.S. Application Data

(60) Provisional application No. 62/077,838, filed on Nov. 10, 2014.

(51) Int. Cl.
| | | |
|---|---|---|
| *C09K 19/00* | (2006.01) | |
| *G02B 5/30* | (2006.01) | |
| *G02B 1/08* | (2006.01) | |

(52) U.S. Cl.
CPC .............. *G02B 5/3083* (2013.01); *G02B 1/08* (2013.01); *Y10T 428/10* (2015.01); *Y10T 428/1036* (2015.01)

(58) Field of Classification Search
CPC ...... G02B 5/3083; G02B 5/32; G02B 5/3008; G02B 1/08; G02F 1/13363; G02F 1/133633; G02F 1/133634; C08G 69/32; C08L 77/10; C08L 77/00; C09K 19/3804; C09K 19/3809; Y10T 428/10; Y10T 428/1036; Y10T 428/1041; Y10T 428/105; C09D 177/06
USPC ....... 428/1.1, 1.3; 349/117, 118; 359/489.06, 359/489.07; 156/60; 528/220, 348; 544/14
See application file for complete search history.

(56) References Cited

U.S. PATENT DOCUMENTS

| | | | |
|---|---|---|---|
| 3,208,814 A | 9/1965 | Sievenpiper et al. | |
| 5,067,797 A | 11/1991 | Yokokura et al. | |
| 5,739,296 A | 4/1998 | Gvon et al. | |
| 5,863,113 A | 1/1999 | Oe et al. | |

(Continued)

FOREIGN PATENT DOCUMENTS

| | | |
|---|---|---|
| EP | 0489951 | 6/1992 |
| JP | 06235917 | 8/1994 |

(Continued)

OTHER PUBLICATIONS

Gribkova "Chemical synthesis of polyaniline in the presence of poly(amidosulfonic acids) with different rigidity of the polymer chain," Apr. 2011, *Polymer* 52(12):2474-2484.

(Continued)

*Primary Examiner* — Ruiyun Zhang
(74) *Attorney, Agent, or Firm* — Mueting, Raasch & Gebhardt, PA

(57) ABSTRACT

The present disclosure relates to a retarder plate with adjustable dispersion of retardation. The retarder can form a quarter-wave plate that exhibits a reverse or flat dispersion of retardation.

13 Claims, 11 Drawing Sheets

(56) References Cited

U.S. PATENT DOCUMENTS

| | | | |
|---|---|---|---|
| 6,002,829 A | 12/1999 | Winston et al. |
| 6,049,428 A | 4/2000 | Khan et al. |
| 6,144,424 A | 11/2000 | Okuda et al. |
| 6,174,394 B1 | 1/2001 | Gvon et al. |
| 6,322,236 B1 | 11/2001 | Campbell et al. |
| 6,399,166 B1 | 6/2002 | Khan et al. |
| 6,481,864 B2 | 11/2002 | Hosseini et al. |
| 6,563,640 B1 | 5/2003 | Ignatov et al. |
| 6,583,284 B1 | 6/2003 | Sidorenko et al. |
| 6,619,553 B1 | 9/2003 | Bobrov et al. |
| 6,841,320 B2 | 1/2005 | Lazarev et al. |
| 6,846,522 B1 | 1/2005 | Bobrov et al. |
| 6,847,420 B2 | 1/2005 | Lazarev et al. |
| 6,848,897 B2 | 2/2005 | Lazarev et al. |
| 6,876,806 B2 | 4/2005 | Lazarev et al. |
| 6,913,783 B2 | 7/2005 | Lazarev et al. |
| 6,942,925 B1 | 9/2005 | Lazarev et al. |
| 6,962,734 B2 | 11/2005 | Nazarov et al. |
| 7,015,990 B2 | 3/2006 | Yeh et al. |
| 7,025,900 B2 | 4/2006 | Sidorenko et al. |
| 7,026,019 B2 | 4/2006 | Dutova et al. |
| 7,031,053 B2 | 4/2006 | Bobrov et al. |
| 7,042,612 B2 | 5/2006 | Lazarev et al. |
| 7,045,177 B2 | 5/2006 | Dutova et al. |
| 7,053,970 B2 | 5/2006 | Lazarev |
| 7,084,939 B2 | 8/2006 | Paukshto et al. |
| 7,092,163 B2 | 8/2006 | Bastawros et al. |
| 7,106,398 B2 | 9/2006 | Bobrov |
| 7,108,749 B2 | 9/2006 | Bobrov |
| 7,110,177 B2 | 9/2006 | Sugino et al. |
| 7,113,337 B2 | 9/2006 | Lazarev et al. |
| 7,132,138 B2 | 11/2006 | Lazarev |
| 7,144,608 B2 | 12/2006 | Paukshto et al. |
| 7,160,485 B2 | 1/2007 | Nazarov et al. |
| 7,166,161 B2 | 1/2007 | Lazarev et al. |
| 7,190,416 B2 | 3/2007 | Paukshto et al. |
| 7,204,938 B2 | 4/2007 | Lazarev |
| 7,211,824 B2 | 5/2007 | Lazarev |
| 7,267,849 B2 | 9/2007 | Lazarev et al. |
| 7,271,863 B2 | 9/2007 | Paukshto et al. |
| 7,291,223 B2 | 11/2007 | Lazarev |
| 7,297,209 B2 | 11/2007 | Lazarev et al. |
| 7,315,338 B2 | 1/2008 | Yeh et al. |
| 7,317,499 B2 | 1/2008 | Paukshto et al. |
| 7,324,181 B2 | 1/2008 | Lazarev et al. |
| 7,405,787 B2 | 7/2008 | Paukshto et al. |
| 7,450,194 B2 | 11/2008 | Lazarev |
| 7,456,915 B2 | 11/2008 | Lazarev et al. |
| 7,479,311 B2 | 1/2009 | Bobrov |
| 7,480,021 B2 | 1/2009 | Rao et al. |
| 7,557,876 B2 | 7/2009 | Lazarev et al. |
| 7,651,738 B2 | 1/2010 | Grodsky et al. |
| 7,660,047 B1 | 2/2010 | Travis et al. |
| 7,733,443 B2 | 6/2010 | Lazarev et al. |
| 7,850,868 B2 | 12/2010 | Matsuda et al. |
| 7,888,505 B2 | 2/2011 | Doutova et al. |
| 7,889,297 B2 | 2/2011 | Palto |
| 7,911,557 B2 | 3/2011 | Lazarev et al. |
| 7,969,531 B1 | 6/2011 | Li et al. |
| 8,081,270 B2 | 12/2011 | Lazarev |
| 8,142,863 B2 | 3/2012 | Palto |
| 8,168,082 B2 | 5/2012 | Matsuda et al. |
| 8,189,165 B2 | 5/2012 | Umemoto et al. |
| 8,257,802 B2 | 9/2012 | Inoue et al. |
| 8,268,937 B2 | 9/2012 | Bos et al. |
| 8,416,376 B2 | 4/2013 | Palto |
| 8,512,824 B2 | 8/2013 | Kasianova et al. |
| 8,551,357 B2 | 10/2013 | Miyazaki et al. |
| 2007/0064417 A1 | 3/2007 | Hatanaka et al. |
| 2007/0110378 A1 | 5/2007 | Zarian |
| 2007/0279934 A1 | 12/2007 | Kim et al. |
| 2007/0285599 A1* | 12/2007 | Oxude .............. G02F 1/133502 349/99 |
| 2008/0042154 A1 | 2/2008 | Wano |
| 2008/0298067 A1 | 12/2008 | Chu |
| 2008/0304283 A1 | 12/2008 | Parker et al. |
| 2009/0269591 A1 | 10/2009 | Kasianova et al. |
| 2010/0039705 A1 | 2/2010 | Doutova et al. |
| 2010/0085521 A1 | 4/2010 | Kasianova et al. |
| 2010/0149471 A1 | 6/2010 | Palto |
| 2010/0190015 A1 | 7/2010 | Kasianova |
| 2010/0215954 A1 | 8/2010 | Kuzmin et al. |
| 2011/0149206 A1 | 6/2011 | Lazarev |
| 2011/0149393 A1 | 6/2011 | Nokel et al. |
| 2011/0182084 A1 | 7/2011 | Tomlinson et al. |
| 2011/0255305 A1 | 10/2011 | Chen et al. |
| 2012/0013982 A1 | 1/2012 | Kharatiyan |
| 2012/0081784 A1 | 4/2012 | Lazarev |
| 2012/0099052 A1 | 4/2012 | Lazarev |
| 2012/0113380 A1 | 5/2012 | Geivandov et al. |
| 2012/0113678 A1 | 5/2012 | Cornelissen et al. |
| 2012/0113680 A1 | 5/2012 | Nakai et al. |
| 2013/0003178 A1 | 1/2013 | Lazarev |
| 2013/0070480 A1 | 3/2013 | Griffin et al. |
| 2013/0251947 A1 | 9/2013 | Lazarev |
| 2014/0133177 A1 | 5/2014 | Miller et al. |
| 2014/0140091 A1 | 5/2014 | Vasylyev |
| 2014/0186637 A1 | 7/2014 | Kasianova et al. |
| 2014/0322452 A1 | 10/2014 | Kasyanova et al. |
| 2014/0350214 A1 | 11/2014 | Kharatiyan |
| 2015/0086799 A1 | 3/2015 | Kasyanova et al. |
| 2015/0123911 A1 | 5/2015 | Poliakov et al. |
| 2015/0266999 A1 | 9/2015 | Kuzmin et al. |

FOREIGN PATENT DOCUMENTS

| | | |
|---|---|---|
| JP | 2010-091984 A | 4/2010 |
| WO | 2010-064194 A1 | 6/2010 |
| WO | 2012-007923 A1 | 1/2012 |
| WO | 2013-119922 A1 | 8/2013 |
| WO | 2014/174381 | 10/2014 |

OTHER PUBLICATIONS

Konoshchuk, "Physicochemical Properties of Chemically and Mechanochemically Prepared Interpolymer Complexes of Poly(3,4-Ethylenedioxythiophene) with Polyamidosulfonate Dopants," Jan. 2014, *Theoretical and Experimental Chemistry* 50(1): 21-28 (Russian Original, Jan. 2014).

Koo et al., "Preparation and humidity-sensitive properties of novel photocurable sulfonated polyimides," *Macromolecular Research*, Dec. 1, 2012, 20(12):1226-1233.

* cited by examiner

US 9,829,617 B2

POLYMER-SMALL MOLECULE FILM OR COATING HAVING REVERSE OR FLAT DISPERSION OF RETARDATION

RELATED APPLICATION

This application claims the benefit under 35 U.S.C. §119 (e) of U.S. Provisional Patent Application No. 62/077,838, filed on Nov. 10, 2014, and titled REVERSE DISPERSION, which is hereby incorporated by reference in its entirety.

BACKGROUND

Optically anisotropic materials are significant in modern optical applications. Many achievements in information display technologies are based on development of anisotropic optical retarder layers.

Most of the phase retarder layers used in modern LCD technology is produced by mechanical stretching of the extruded or cast polymers. Control of optical anisotropy can be achieved by adjusting stretching parameters as well as material selection. A polymeric phase retarder layer, for example, can be attached to a PVA (polyvinyl alcohol) polarizer sandwiched between protective layers. Retarder layers can combine both optical compensation and protective functions. For example, cyclic-olefin polymers (COP) are used for manufacturing of phase retarder layers for optical compensation of vertical alignment (VA) and in-plane switching (IPS) LCD modes, while at the same time providing a protective function. However, COP based phase retarder layers as well as other hydrophobic polymeric materials have a problem of adhesion to the hydrophilic PVA layer.

SUMMARY

The present disclosure relates to a retarder that exhibits a reverse or flat reverse dispersion of retardation. The retarder can form a quarter-wave plate or an achromatic quarter-wave plate.

In one aspect, a retarder includes a layer comprising a mixture of birefringent small molecules and birefringent polymers. The birefringent polymers have an in-plane slow axis primarily in a first direction and the birefringent small molecules have an in-plane slow axis substantially orthogonal to the first direction.

In another aspect, a method of forming a retarder includes combining birefringent polymers and birefringent small molecules with water to form an aqueous mixture. Then, the method includes shear coating the aqueous mixture onto a substrate to form an aligned aqueous layer and drying the aligned aqueous layer to form a retarder. The birefringent polymers have an in-plane slow axis primarily in a first direction and the birefringent small molecules have an in-plane slow axis substantially orthogonal to the first direction. In many embodiments the first direction is the shear coating direction.

These and various other features will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings; in which.

DETAILED DESCRIPTION

Figure 1:
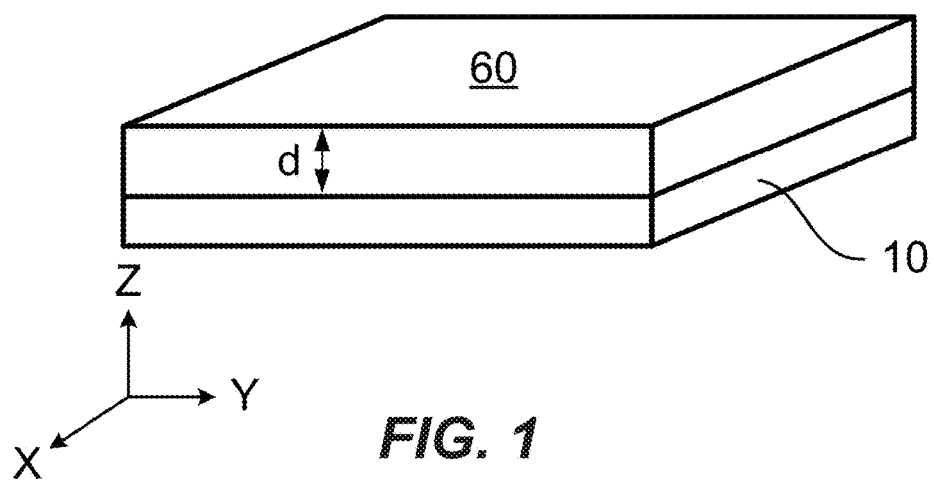
FIG. 1 is an schematic diagram of an illustrative single layer retarder on a substrate with a coordinate system.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

In this disclosure:

"thermally stable" refers to materials that remain substantially intact at 100 degrees Celsius;

"birefringent" refers to the optical property of a material having a refractive index that depends on the polarization and/or propagation direction of light be transmitted therethrough;

"refractive index" or "index of refraction," refers to the absolute refractive index of a material that is understood to be the ratio of the speed of electromagnetic radiation in free space to the speed of the radiation in that material. The refractive index can be measured using known methods and is generally measured using an Abbe refractometer in the visible light region (available commercially, for example, from Fisher Instruments of Pittsburgh, Pa.). It is generally appreciated that the measured index of refraction can vary to some extent depending on the instrument;

"substantially transparent" refers to a material that transmits at least 90%, or at least 95%, or at least 98% of incident visible light excluding reflections at the interfaces (e.g., due to refractive index mismatches). Light transmittance values can be measured using ASTM methods and commercially available light transmittance instruments;

"visible light" refers to wavelengths in a range generally from about 400 nm to about 700 nm;

"substantially non-scattering" refers to a material that has a haze value of less than 10% or less than 5% or less than 1%, haze values can be measured using ASTM methods and commercially available haze meters from BKY Gardner Inc., USA, for example;

"achromatic" refers to color-less;

"retarder layer" refers to an optically anisotropic layer which is characterized by three principal refractive indices ($n_x$, $n_y$ and $n_z$), wherein two principal directions for refractive indices $n_x$ and $n_y$ define the xy-plane coinciding with a plane of the retarder layer and one principal direction for refractive index ($n_z$) coincides with a normal line to the retarder layer;

"optically anisotropic retarder layer of positive A-type" (+A) refers to an uniaxial optic layer in which principal refractive indices $n_x$, $n_y$, and $n_z$ obey the following condition in the visible spectral range: $n_z=n_y<n_x$;

"optically anisotropic retarder layer of negative A-type" (−A) refers to an uniaxial optic layer in which principal refractive indices $n_x$, $n_y$, and $n_z$ obey the following condition in the visible spectral range: $n_z=n_y>n_x$.

The present disclosure relates to a retarder that exhibits a reverse or flat reverse dispersion of retardation. The retarder can form a quarter-wave plate or an achromatic quarter-wave plate. The retarder is formed of a single layer that includes a small molecule component and a polymer component. In other embodiments the retarder is formed of two layers where the first layer is formed of a small molecule component and the second layer is formed of a polymer component. The small molecule component and the polymer component are birefringent materials. In many embodiments the small molecule component and the polymer component exhibit a lyotropic liquid crystal phase. The retarder can exhibit in-plane retardation that increases with increasing light wavelength. In other embodiments the retarder exhibits substantially constant in-plane retardation as a function of wavelength. The retarder can be a thermally stable film that can be substantially transparent and substantially non-scattering. While the present disclosure is not so limited, an appreciation of various aspects of the disclosure will be gained through a discussion of the examples provided below.

Birefringence described herein refers to macroscopic birefringence. For example, coating the birefringent polymers or birefringent small molecules (described herein) by any type of shear coating can align the molecules in more or less or primarily the same direction over a macroscopic dimension and exhibit a macroscopic birefringence. Birefringence can be characterized by measuring a refractive index of the three principal refractive indices ($n_x$, $n_y$ and $n_z$) associated with the Cartesian coordinate system related to the deposited birefringent polymer or small molecule layer or the corresponding major surface of the retarder film or plate. Two principal directions for refractive indices $n_x$ and $n_y$ define the xy-plane coinciding with a plane of the retarder, while one principal direction for refractive index ($n_z$) coincides with a normal line to the retarder, as illustrated in FIG. 1.

An anisotropic film or coating has both a fast axis and a slow axis. An in-plane fast axis is defined by the axis corresponding to the refractive index $n_x$ or $n_y$, whichever is smaller. The in-plane slow axis is defined by the axis corresponding to the refractive index $n_x$ or $n_y$, whichever is larger.

A quarter-wave plate is an optical element providing $\pi/2$ phase shift between principal light components with orthogonal polarizations. It means that in-plane retardation of the plate is equal to ¼ of the wavelength. For example, at a light wavelength of 400 nm, the in-plane retardation is equal to 100 nm.

Materials transparent to visible light exhibit normal dispersion, indicating a refractive index that decreases with increasing wavelength. A difference of in-plane indices usually results from normal dispersion. A birefringent material forms a birefringent film that has refractive indices $n_x$, $n_y$, and $n_z$ where $n_x$ and $n_y$ correspond to two mutually perpendicular directions in a plane and $n_z$ corresponds to the normal direction to the plane. In many embodiments, at least one of these refractive indices has a different value than the other refractive indices.

Figure 2:
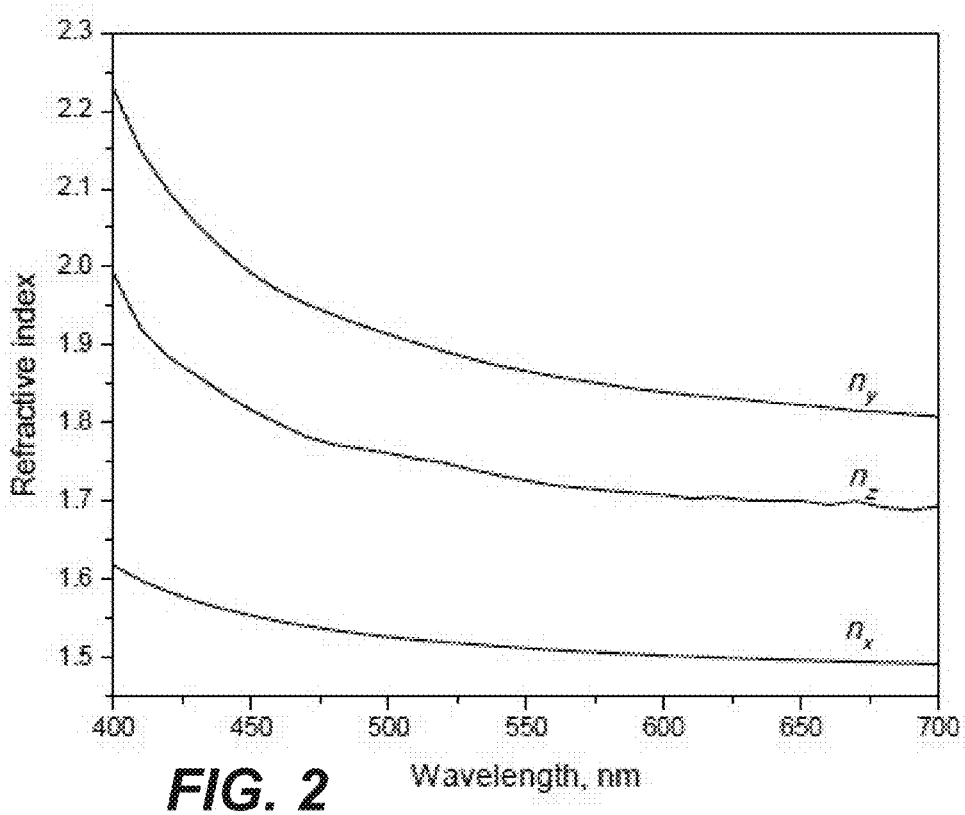
FIG. 2 is a graph of illustrative normal dispersion curves of refractive indexes for each direction of the layer of FIG. 1, for visible light wavelengths for an exemplary material.
Figure 3:
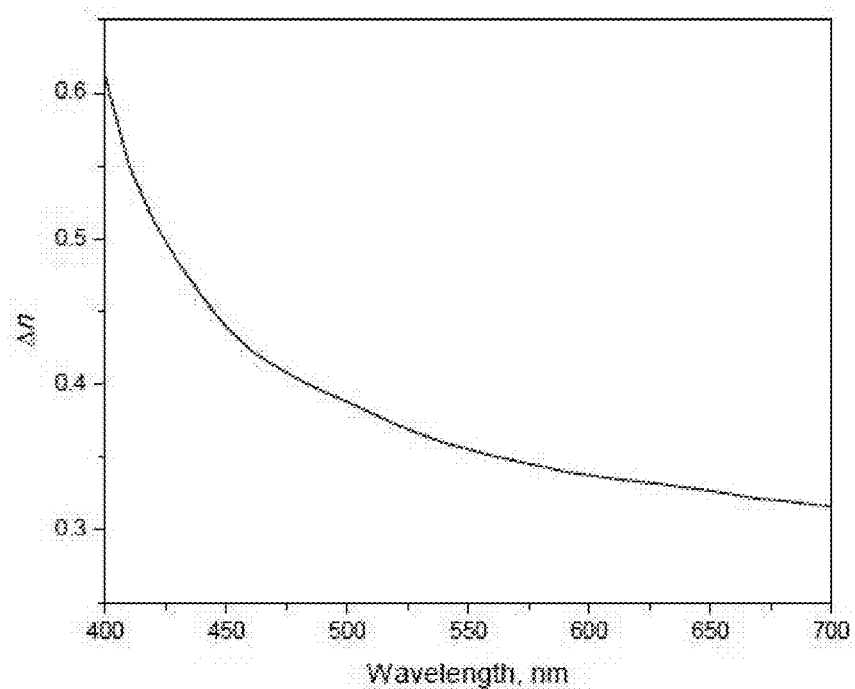
FIG. 3 is a graph of in-plane difference in refractive index $\Delta n=(n_y-n_x)$ of the curves of FIG. 2.

FIG. 1 illustrates this coordinate system for a retarder 60 having a thickness d. FIG. 2 illustrates normal dispersion curves (where refractive index decreases with increasing wavelength). Retardance or $R_0$ is equal to the difference in refractive index ($\Delta n$) multiplied by the thickness of the film (d). Here in-plane difference in refractive index $\Delta n=(n_y-n_x)$ is illustrated in FIG. 3. Thus, a retarder plate or quarter-wave plate (QWP) made of a material having normal dispersion does not compensate all the wavelengths equally well.

Figure 4:
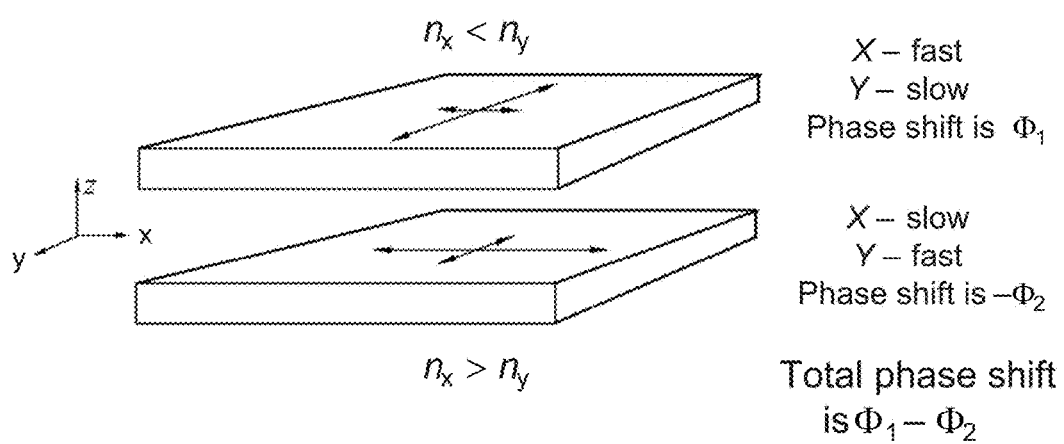
FIG. 4 is a schematic diagram of quarter-wave plate resulting from a combination of two +A plates with their slow axes (and fast axes) orthogonal to each other.
Figure 5:
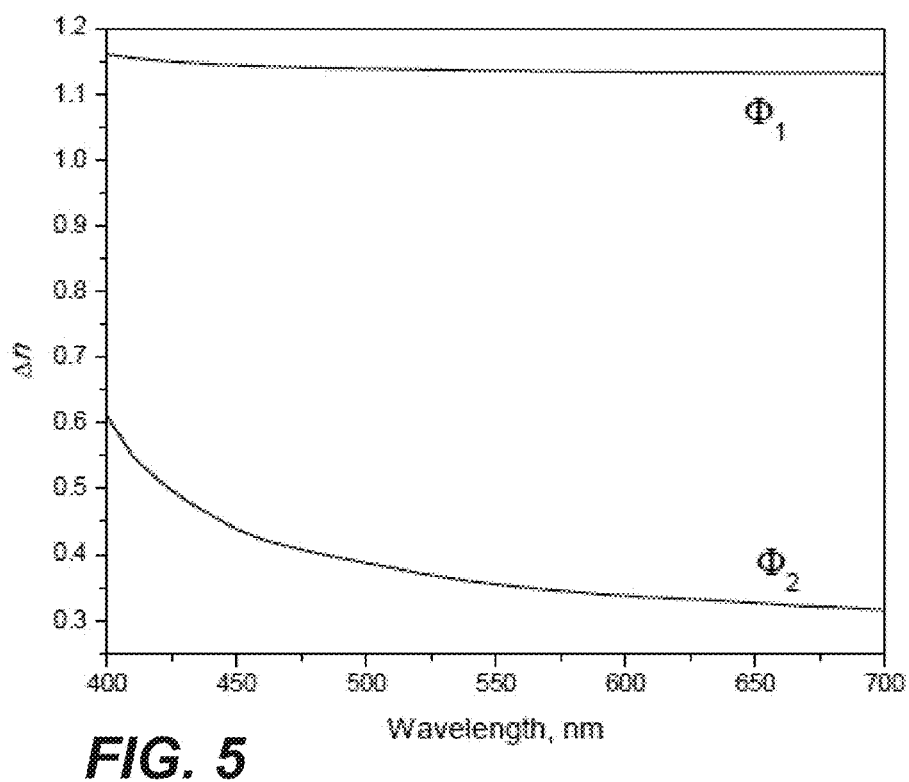
FIG. 5 is a graph of two lines plotting the phase shift of the two +A plates of FIG. 4.
Figure 6:
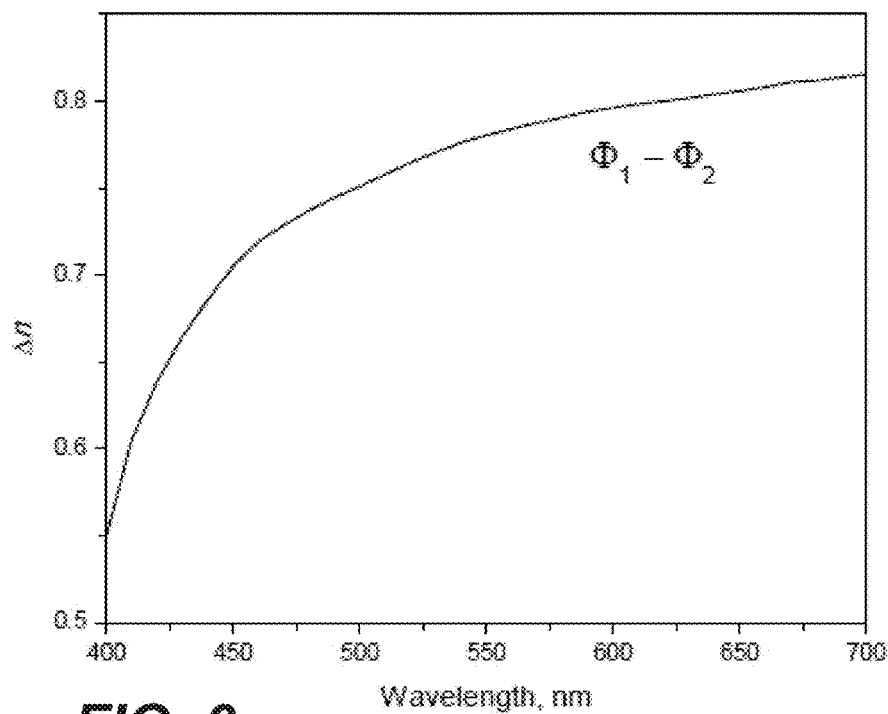
FIG. 6 is a graph of the net resulting phase shift of the two +A plates of FIG. 4 illustrating reverse dispersion.

This problem can be solved when two +A plates are stacked such that their fast axes (or slow axes) are orthogonal resulting in a combination that is illustrated in FIG. 4. In one illustrative embodiment, a +A plate utilizes cyclic-olefin polymer ("COP") substrate (normal, but almost flat, dispersion curve) coated with a birefringent small molecule layer, described below in Example 2 (positive dispersion curve). Due to a 90 degrees rotation of in-plane principal axes, the resultant dispersion curve of these two materials (see FIG. 5) is effectively a subtraction of their individual dispersion characteristics: approximately wavelength independent (constant) for COP minus positive for the described small molecule, results in a negative overall dispersion or reverse dispersion (where in-plane difference of refractive index $\Delta n=(n_y-n_x)$ increases as light wavelength increases) as illustrated in FIG. 6. In these embodiments, the retarder exhibits an in-plane retardation that increases as a function of wavelength in a wavelength range of 400 to 700 nanometers.

In other embodiments the retarder has approximately constant or flat dispersion in the visible wavelength range from about 400 nm to about 700 nm. In these embodiments the retarder exhibits an in-plane retardation values that varies by +/-5% or less in or over a wavelength range from 400 to 700 nanometers, or varies by +/-3% or less in or over a wavelength range from 400 to 700 nanometers, or varies by +/-2% or less in or over a wavelength range from 400 to 700 nanometers, or varies by +/-1% or less in or over a wavelength range from 400 to 700 nanometers. In one illustrative embodiment, a single layer mixture of birefringent small molecule and birefringent polymer exhibits a flat dispersion curve, described below in Example 5.

FIG. 1 is a schematic diagram of an illustrative single layer retarder 60. The retarder 60 can be disposed or coated onto a substrate 10. In many embodiments, the substrate 10 is optically isotropic. In other embodiments, the substrate 10 is optically anisotropic. In some embodiments, the retarder 60 is on a release layer of the substrate 10. In many of these embodiments, the retarder 60 (which has been formed on a release layer of the substrate 10) can be laminated onto an optical element, forming a laminated optical element, and then the substrate 10 can be released or cleanly removed from the retarder 60 layer.

In some embodiments the substrate 10 has an optical function and the resulting single layer retarder 60 can be referred to as a multifunctional optical film. In some of these embodiments the substrate 10 is an optical element such as a polarizer, diffuser or prism film.

In many embodiments, the retarder 60 is a layer comprising a mixture of birefringent small molecules and birefringent polymers. The birefringent polymers have an in-plane slow axis primarily in a first direction and the birefringent small molecules having an in-plane slow axis substantially orthogonal to the first direction. In many of these embodiments the substrate is isotropic.

The phrase "birefringent small molecules" refers throughout the specification to a population or plurality of birefringent small molecules. This population can include small molecules that are isomers, or have primarily the same chemical structure or primarily two or more different chemical structures, or three or more different chemical structures. In some embodiments, a population that has two or more different chemical structures of the birefringent small molecules can provide quicker or more uniform alignment properties to the overall population of birefringent small molecules.

The phrase "birefringent polymers" refers throughout the specification to a population or plurality of birefringent polymers. This population can include polymers that have primarily the same chemical backbone or same polymer structure or primarily two or more isomer or different chemical backbones or structures, or three or more isomers or different chemical backbones or structures.

In many embodiments, this single layer retarder 60 exhibits an in-plane retardation that increases as a function of wavelength in a wavelength range of 400 to 700 nanometers (reversion dispersion of retardation). In other embodiments, this single layer retarder 60 exhibits in-plane retardation values that vary by +/-5% or less, or +/-3% or less, or +/-2% or less, or +/-1% or less in or over a wavelength range from 400 to 700 nanometers (flat dispersion of retardation).

The single layer retarder 60 can have a thickness of less than 25 micrometers, or less than 20 micrometers, or less than 10 micrometers, or less than 5 micrometers. In many embodiments, this single layer retarder 60 has a thickness in a range from 1 to 10 micrometers, or from 1 to 5 micrometers. In many embodiments, the retarder 60 is a quarter-wave plate or an achromatic quarter-wave plate.

The single layer retarder 60 has a weight ratio of birefringent polymers:birefringent small molecules in a range from 95:5 to 60:40. This ratio can range from 95:5, 90:10, 85:15, 80:20, 75:25, 70:30, 65:35 or 60:40 and any combination of these ranges are contemplated, depending on the desired optical properties. In other embodiments, the single layer retarder 60 has a weight ratio of birefringent polymers: birefringent small molecules in a range from 5:95 to 40:60. This ratio can range from 5:95, 10:90, 15:85, 20:80, 25:75, 30:70, 35:65 or 40:60 and any combination of these ranges are contemplated, depending on the desired optical properties.

Figure 7:
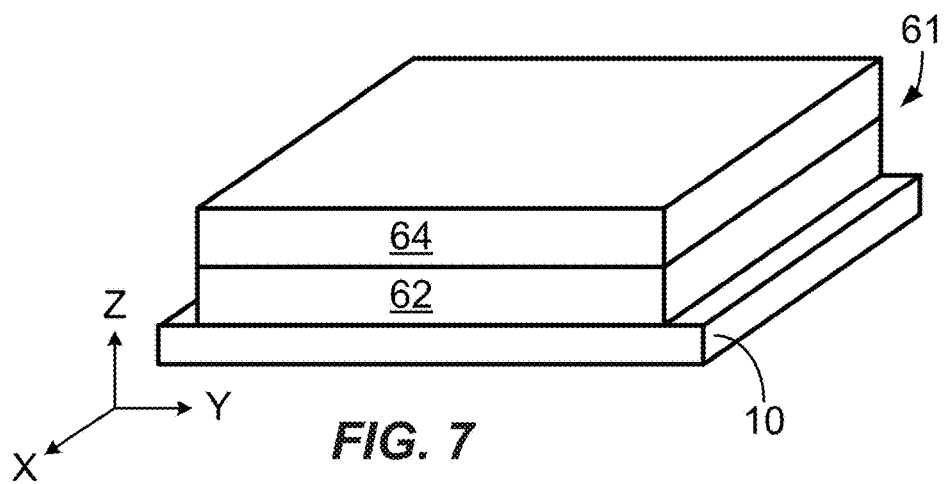
FIG. 7 is a schematic diagram of an illustrative two-layer retarder.
Figure 8:
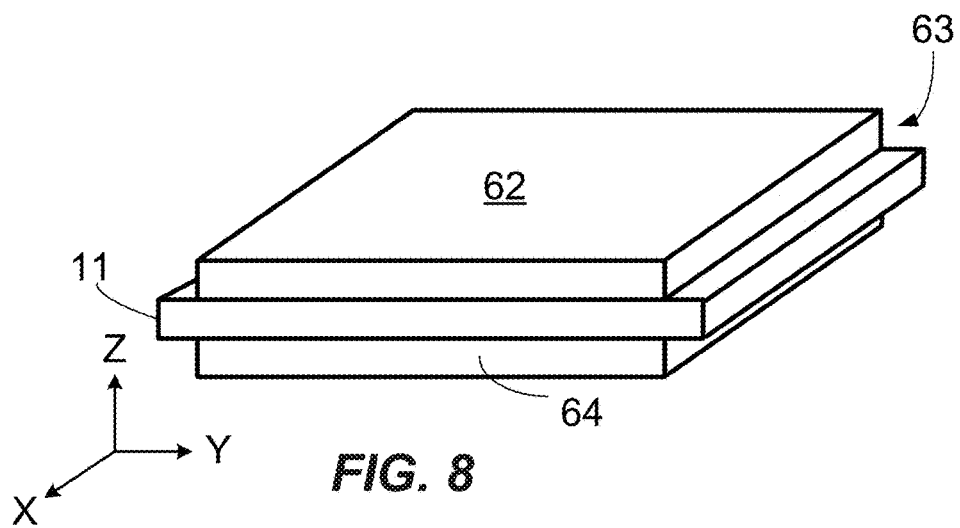
FIG. 8 is a schematic diagram of another illustrative two-layer retarder.

FIG. 7 is schematic diagram of an illustrative two-layer retarder 61. FIG. 8 is a schematic diagram of another illustrative two-layer retarder 63. A first layer 62 can be a layer formed of birefringent small molecules and the second layer 64 can be formed of birefringent polymers. The birefringent polymers have an in-plane fast axis primarily in a first direction (along Y axis, for example) and the birefringent small molecules having an in-plane fast axis substantially orthogonal to the first direction (along X axis, for example).

In many embodiments, this two-layer retarder 61, 63 exhibits an in-plane retardation that increases as a function of wavelength in a wavelength range of 400 to 700 nanometers (reversion dispersion of retardation). In other embodiments, this two-layer retarder 61, 63 exhibits in-plane retardation values that vary by +/-5% or less, or +/-3% or less, or +/-2% or less, or +/-1% or less in or over a wavelength range from 400 to 700 nanometers (flat dispersion of retardation).

FIG. 7 illustrates the second layer 64 disposed on the first layer 62 and the first layer 62 disposed on the substrate 10. FIG. 8 illustrates the second layer 64 and the first layer 62 disposed on opposing major surfaces of the substrate 11, where the substrate 11 separates the second layer 64 and the first layer 62 from each other.

In some embodiments, the retarder 61 is on a release layer of the substrate 10. In many of these embodiments, the retarder 61 can be laminated onto an optical element, forming a laminated optical element, and then the substrate 10 can be released or cleanly removed from the retarder 61 layer.

In some embodiments the substrate 10 has an optical function and the resulting single layer retarder 61 can be referred to as a multifunctional optical film. In some of these embodiments the substrate 10 is an optical element such as a polarizer, diffuser or prism film.

The first layer 62 and the second layer 64 can be disposed or coated onto a substrate 10, 11. In many embodiments, the substrate 10, 11 is optically isotropic. In other embodiments, the substrate 10, 11 is optically anisotropic. In some embodiments the substrate 10, 11 is an optical element such as a polarizer.

The two-layer retarder 61 has a total thickness of less than 25 micrometers, or less than 20 micrometers, or less than 10 micrometers, or less than 5 micrometers. In many embodiments, this two-layer retarder 61 has a thickness in a range from 1 to 10 micrometers, or from 1 to 5 micrometers. In many embodiments, the retarder 61 is a quarter-wave plate or an achromatic quarter-wave plate. The thickness of the first layer 62 and the second layer 64 can be determined based on the desired optical property of the two-layer retarder 61. In many embodiments the layers can have a thickness ratio of first layer:second layer in a range from 90:10 to 10:90.

The two-layer retarder 61 can be formed by shear coating a first layer of aqueous birefringent polymers or birefringent small molecules onto the substrate 10 to form an aligned aqueous layer. Then the aligned aqueous layer is dried to form a first layer 62. Since the first layer 62 is formed of water-soluble material, it can be stabilized or passivated by ion exchange. The first layer 62 can be thermally stable, substantially transparent and substantially non-scattering. Then the second layer of aqueous birefringent polymers or birefringent small molecules is shear coated onto the first layer 62 to form an aligned aqueous layer. Then the aligned aqueous layer is dried to form a second layer 64. Since the second layer 64 is formed of water-soluble material, it can be stabilized or passivated by ion exchange. The second layer 64 can be thermally stable that can be substantially transparent and substantially non-scattering.

Retarders described herein can be formed by shear coating the aqueous birefringent polymers or birefringent small molecules onto the substrate 10 to form an aligned aqueous layer. Shear coating methods include slot coating, die coating, gravure coating, and the like. In many embodiments the coating or machine direction is referred to as the X axis. In many of these embodiments the small molecule fast axis is parallel to the X axis and the polymer fast axis is orthogonal (and in-plane) to the X axis (or parallel to the Y axis), likewise the polymer slow axis is parallel to the X axis (coating or machine direction) and the small molecule slow axis is substantially orthogonal (and in-plane) to the X axis (or parallel to the Y axis).

The two-layer retarder 63 can be formed by simultaneously shear coating the aqueous birefringent polymer onto one side of the substrate 11 and the aqueous birefringent small molecule onto an opposing side of the substrate 11. Then both coated sides are dried and optionally passivated to form the two-layer retarder 63 where the second layer 64 and the first layer 62 are disposed on opposing major surface of the substrate 11.

Each layer 62, 64 of the two-layer retarder 63 can have has a thickness in a range from 1 to 10 micrometers, or from 1 to 5 micrometers. In many embodiments, the retarder 63 is a quarter-wave plate or an achromatic quarter-wave plate. The thickness of the first layer 62 and the second layer 64 can be determined based on the desired optical property of the two layer retarder 61. In many embodiments the layers can have a thickness ratio of first layer:second layer in a range from 90:10 to 10:90.

Figure 9:
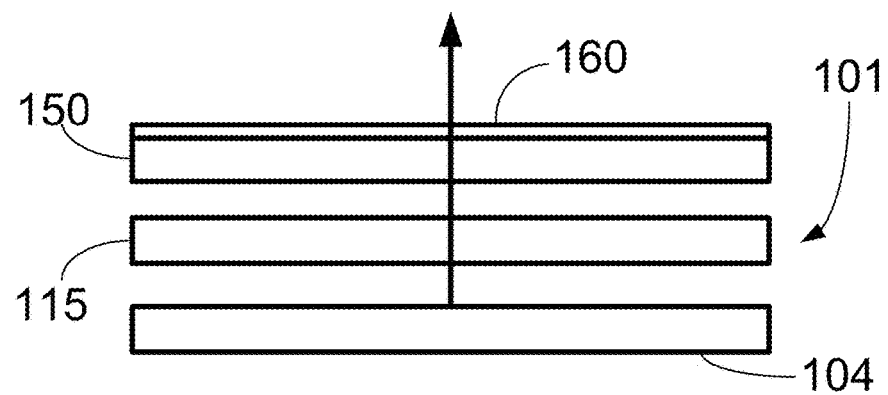
FIG. 9 is a schematic diagram of an illustrative display where the retarder is inside a liquid crystal display panel.

FIG. 9 is a schematic diagram of an illustrative display 101 where the retarder 160 is within the liquid crystal display panel 150. The display 101 includes a film stack 115 between a backlight 104 and an LCD panel 150. The film stack 115 includes one or more diffusers and one or more prism films. The retarder 160 can be disposed between the liquid crystal cell and the front polarizer of the liquid crystal display panel 150. The arrow illustrates the general direction of light emission from the display.

Figure 10:
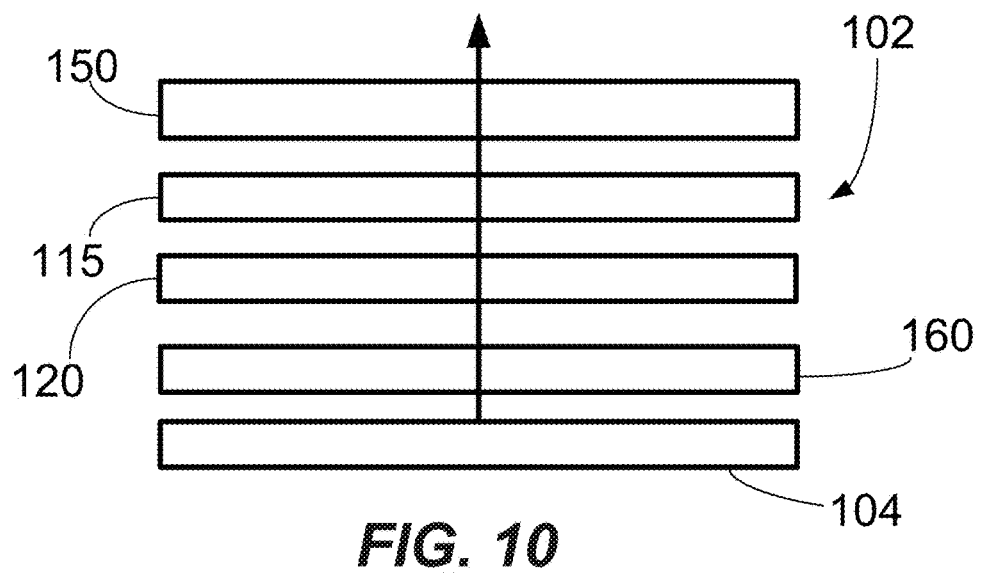
FIG. 10 is a schematic diagram of an illustrative display where the retarder is adjacent to the backlight.

FIG. 10 is a schematic diagram of an illustrative display 102 where the retarder 160 is adjacent to the backlight 104. The display 102 can include a film stack 115 between a reflective polarizer 120 and an LCD panel 150. The film stack 115 includes one or more diffusers and one or more prism films. The retarder 160 is disposed between the backlight 104 and the reflective polarizer 120. The arrow illustrates the direction of light propagation from the display.

Figure 11:
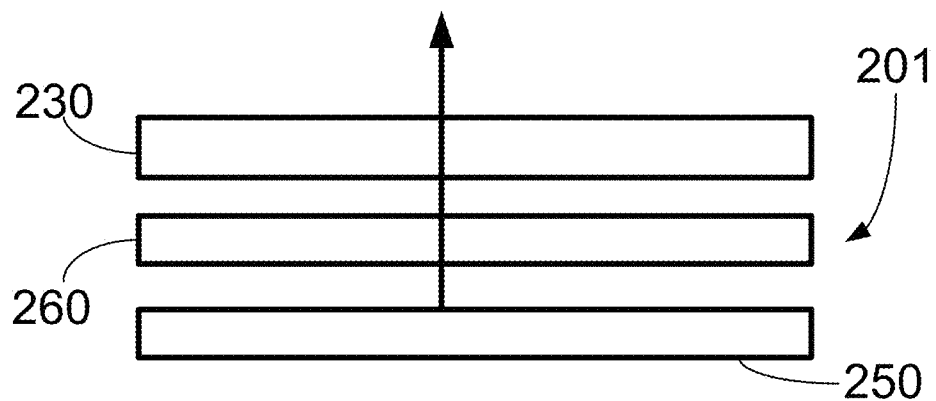
FIG. 11 is a schematic diagram of an illustrative organic light emitting diode ("OLED") display.
Figure 12:
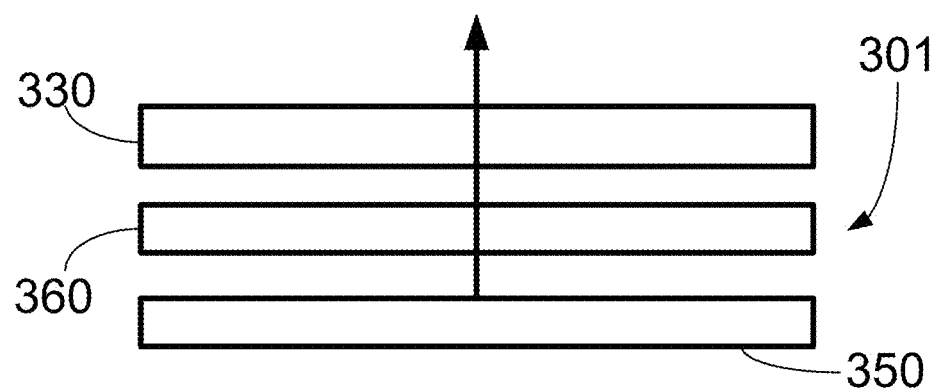
FIG. 12 is a schematic diagram of an illustrative liquid crystal display panel.

FIG. 11 is a schematic diagram of an illustrative OLED (organic light emitting diode) display 201. The retarder 260 is disposed between the OLED 250 and a circular polarizer 230. FIG. 12 is a schematic diagram of an illustrative liquid crystal display panel 301. The retarder 360 is disposed between the liquid crystal cell 250 and a polarizer 330 (such as a front polarizer). In some embodiments, the display assemblies 101, 102, 201, 301 include additional components or fewer components than illustrated in FIGS. 9-12. The arrow illustrates the general direction of light propagation from the display.

Figure 13:
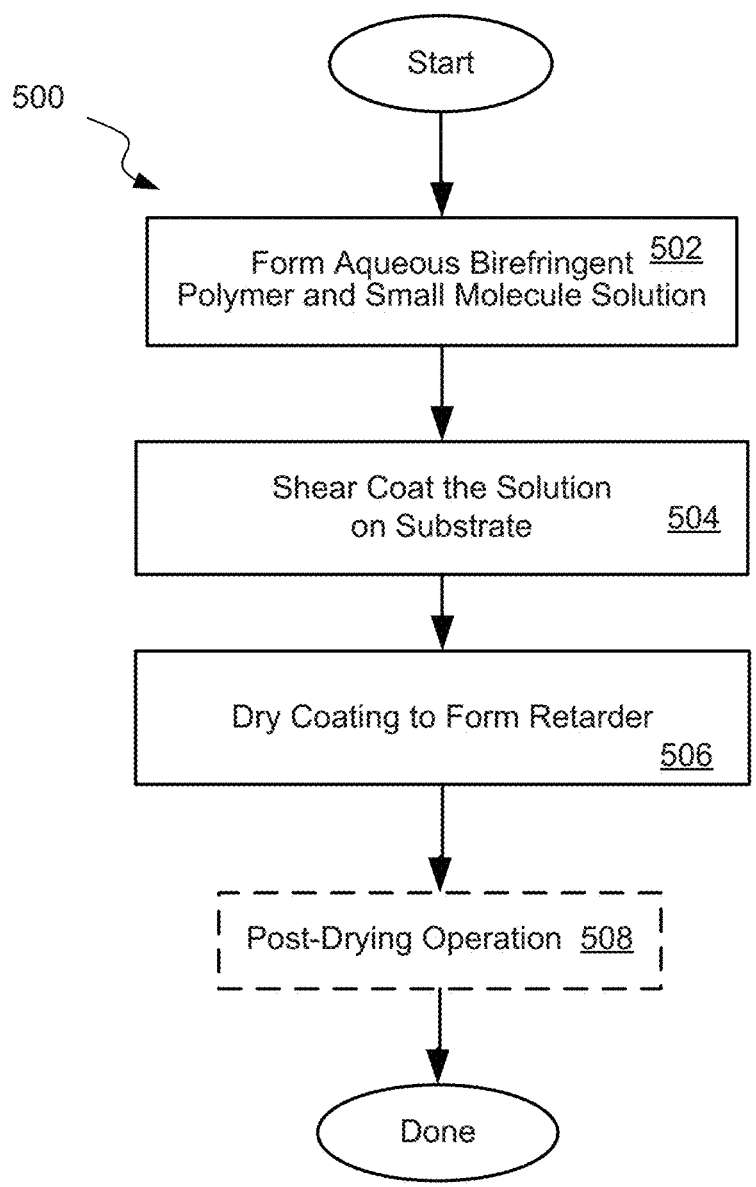
FIG. 13 illustrates a flow diagram for a method of forming a retarder described herein.

FIG. 13 illustrates a flow diagram 500 for forming the retarder described herein. The single layer retarder 60 can be formed by combining birefringent polymers and birefringent small molecules with water to form an aqueous mixture (step 502). Alternatively these materials can be coated separately in layers as illustrated in FIG. 7 and FIG. 8. This aqueous mixture (or individual aqueous solutions of birefringent polymers or birefringent small molecules) is shear coated onto a substrate 10 to form an aligned aqueous layer (step 504). Then the aligned aqueous layer is dried to form a retarder 60 (step 506). Since the retarder 60 is formed of water-soluble material, it can be optionally stabilized or passivated by ion exchange (step 508 is described as a post-drying operation). The retarder 60 can be a thermally stable film that can be substantially transparent and substantially non-scattering.

The birefringent small molecule and/or birefringent polymer coating solution exhibits a lyotropic liquid crystal phase. The coating solution is at least 75% wt, or at least 80% wt, or at least 85% wt, or at least 90% wt water. In many embodiments the coating solution is from 1 to 25% wt, or from 1 to 20% wt, or from 1 to 15% wt, or from 1 to 10% wt lyotropic liquid crystal material. Shear coating allows the coating solution to be aligned according to the coating direction.

Birefringent Polymers

The birefringent polymers can be made from various base materials having suitable optical birefringent and other properties, such as thermal resistance, light transmittance, and the like. The birefringent polymers are water-soluble and exhibit a liquid crystal phase in water. The birefringent polymers can be deposited, or coated onto a substrate via an aqueous solution. Once coated or deposited the aligned birefringent polymers can be stabilized or made less water-soluble by cross-linking or by ion exchange, generally termed "passivation."

An exemplary birefringent lyotropic liquid crystal polymer is a birefringent polyamide that exhibits a lyotropic liquid crystal phase having the following formula:

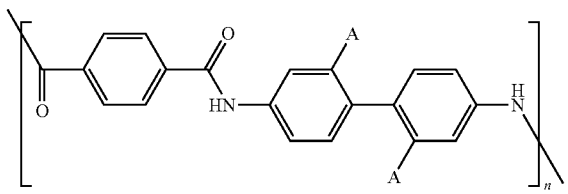

wherein;
A is independently selected from $SO_3H$ or COOH, or their salt of an alkali metal, ammonium, quaternary ammonium, alkali earth metal, $Al^{3+}$, $La^{3+}$, $Fe^{3+}$, $Cr^{3+}$, $Mn^{2+}$, $Cu^{2+}$, $Zn^{2+}$, $Pb^{2+}$ or $Sn^{2+}$; and n is an integer from 2 to 10,000. In one embodiment, the number-average molecular weight is about 10,000 to about 150,000. In another embodiment, the number-average molecular weight is about 50,000 to about 150,000.

In many embodiments the birefringent polyamide is a polymer of a formula below:

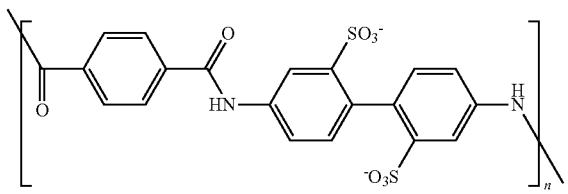

wherein n is an integer in a range from 2 to 10,000 or from 5 to 2000. In one embodiment, the number-average molecular weight is about 10,000 to about 150,000. In another embodiment, the number-average molecular weight is about 50,000 to about 150,000. This polymer is referred to as: poly(2,2'-disulfo-4,4'-benzidine terephthalamide) and can be a sodium or ammonium salt thereof. An example of a synthesis of this polymer is described in U.S. Pat. No. 8,512,824. A birefringent polyamide film or layer formed from this polymer is birefringent and has the following refractive indices: $n_x=1.84$, $n_y=n_z=1.58$, where $n_x$ and $n_y$ correspond to two mutually perpendicular directions in a plane and $n_z$ corresponds to the normal direction to the plane.

An exemplary birefringent lyotropic liquid crystal polymer is a birefringent polymer that can exhibit a lyotropic liquid crystal phase having the following formula:

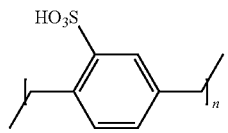

or salt thereof, wherein n is an integer in a range from 25 to 10,000. This polymer is referred to as poly(monosulfo-p-xylene) or salt thereof.

This polymer can be synthesized as follows:

300 ml of sulfuric acid was added to 212 g of p-xylene at 90° C. The reaction mass was stirred at 90-100° C. for 30 min then cooled to 20-25° C. and poured into a beaker with 500 g of mixture of water and ice. The resulting suspension was separated by filtration and the filter cake rinsed with cool (5° C.) solution of 300 ml of hydrochloric acid in 150 ml of water.

The material was vacuum dried at 50 mbar and 50° C. for 24 hrs. Yield of 2,5-dimethylbenzenesulfonic acid was 383 g (contained 15% water).

92.6 g of 2,5-dimethylbenzenesulfonic acid was added to 1700 ml of chloroform and the mixture was purged with argon gas. Then it was heated to boiling with a 500 W lamp placed right against the reaction flask so that stirred contents of the flask was well lit. 41 ml bromine in 210 ml of chloroform was added dropwise within 4-5 hrs to the agitated boiling mixture. Once all bromine had been added the light exposure with refluxing continued for an extra hour. 900 ml of chloroform was distilled and the reaction mass was allowed to cool overnight. Precipitated material was isolated by filtration, the filter cake was rinsed with 100 ml of chloroform, squeezed and recrystallized from 80 ml of acetonitrile. Yield of 2,5-bis(bromomethyl)benzenesulfonic acid was 21 g.

Figure 14:
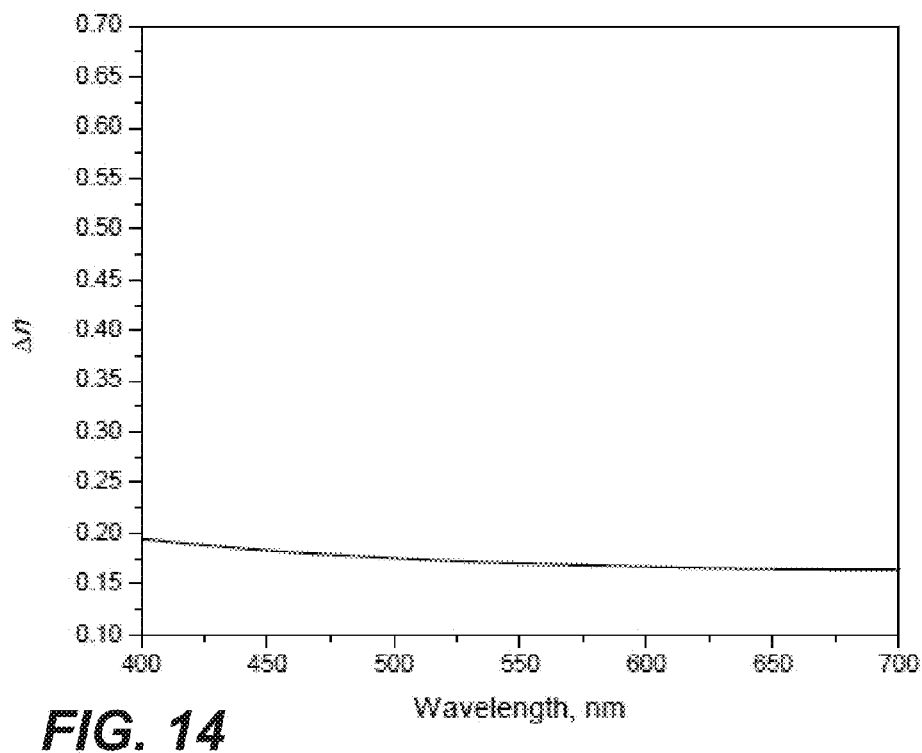
FIG. 14 is a graph illustrating the dispersion of in-plane anisotropy of a coating made of poly(monosulfo-p-xylene)

4.0 g of sodium borohydride in 20 ml of water was added to a stirred mixture of 340 mg of $CuCl_2$, 10.0 g of 2,5-bis(bromomethyl)benzenesulfonic acid, 10.4 g of sodium bromide, 45 ml of amyl alcohol and 160 ml of degassed water and the reaction mass was agitated for 10 min. Then the mixture was transferred to a 1-liter reparatory funnel, 300 ml of water was added and after shaking the mixture was allowed to stand for an hour. The bottom layer was isolated, clarified by filtration and ultrafiltered using a polysulfone membrane with 10,000 molecular weight cut-off. Yield of polymer (Na salt) is 4.0 g (on dry basis). An aqueous solution of this material was coated onto a glass substrate with a Mayer rod and dried. The dispersion of in-plane retardation of this coating was graphed and is illustrated in FIG. 14.

Birefringent Small Molecules

The birefringent small molecules can be made from various base materials having suitable optical birefringent and other properties, such as thermal resistance, light transmittance, and the like. The birefringent small molecules are water-soluble and exhibit a liquid crystal phase in water. The birefringent small molecules can be deposited, or coated onto a substrate via an aqueous solution. Once coated or deposited the aligned birefringent small molecules can be stabilized or made less water-soluble by ion exchange, generally termed "passivation."

An exemplary birefringent lyotropic liquid crystal is a birefringent small molecule that exhibits a lyotropic liquid crystal phase having the following formula:

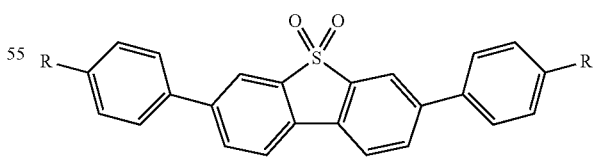

wherein;
R is independently selected from $SO_3H$ or COOH, or their salt of an alkali metal, ammonium, quaternary ammonium, alkali earth metal, $Al^{3+}$, $La^{3+}$, $Fe^{3+}$, $Cr^{3+}$, $Mn^{2+}$, $Cu^{2+}$, $Zn^{2+}$, $Pb^{2+}$ or $Sn^{2+}$.

In many embodiments the birefringent small molecule has the formula below:

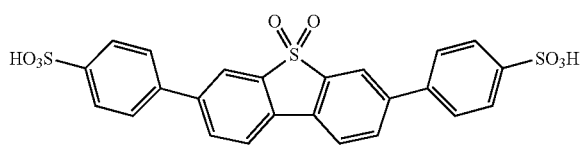 [SMILES: O=S(=O)(O)c1ccc(-c2ccc3c(c2)S(=O)(=O)c2cc(-c4ccc(S(=O)(=O)O)cc4)ccc2-3)cc1]

This is referred to as 4,4'-(5,5'-dioxidodibenzo[b,d]thiene-3,7-diyl)dibenzenesulfonic acid). Examples of synthesis of this small molecule are described in U.S. 2012/0113380. A birefringent film or layer formed from this small molecule is birefringent and has the following refractive indices: $n_x$=1.51, $n_y$=1.87, $n_z$=1.73, where $n_x$ and $n_y$ correspond to two mutually perpendicular directions in a plane and $n_z$ corresponds to the normal direction to the plane.

Figure 15:
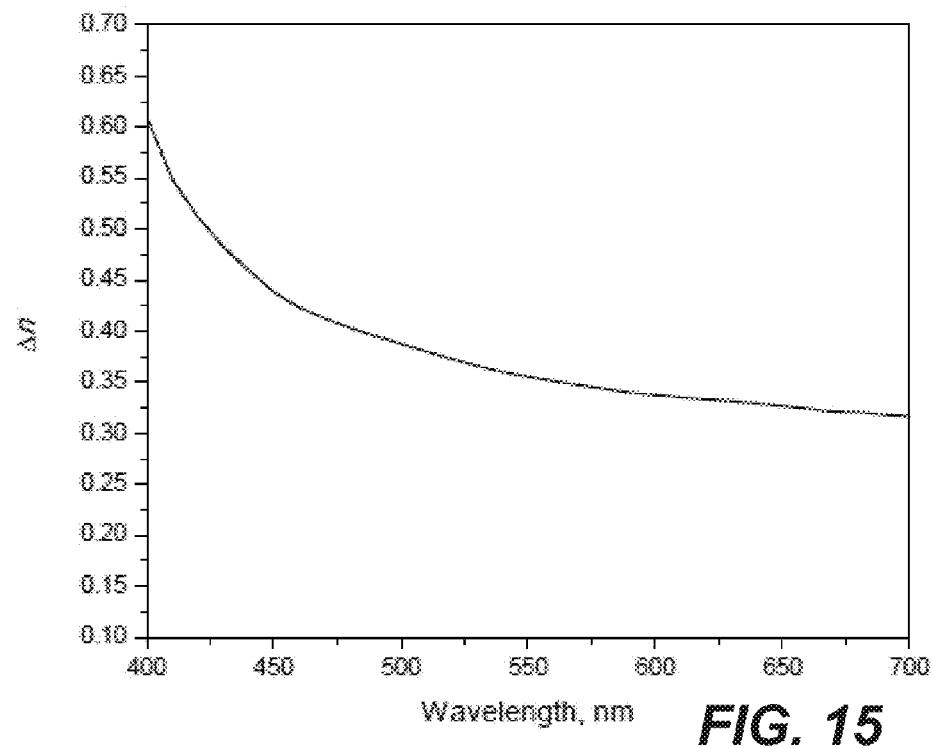
FIG. 15 is a graph illustrating the dispersion of in-plane anisotropy of a coating made of 2(3)-sulfo-6,7-dihydrobenzimidazo[1,2-c]quinazoline-6-one-9(10)-carboxylic acid.

Another exemplary birefringent lyotropic liquid crystal is a birefringent small molecule having the following formula:

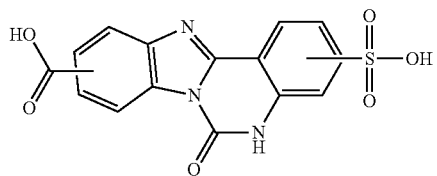

or salt thereof. This small molecule is referred to as 2(3)-sulfo-6,7-dihydrobenzimidazo[1,2-c]quinazoline-6-one-9(10)-carboxylic acid. Examples of synthesis of this small molecule are described in U.S. 2010/0039705. An aqueous solution of this material was coated onto a glass substrate with a Mayer rod and dried. The dispersion of in-plane retardation of this coating was graphed and is illustrated in FIG. 15.

A further exemplary birefringent lyotropic liquid crystal is a birefringent small molecule having the following formula:

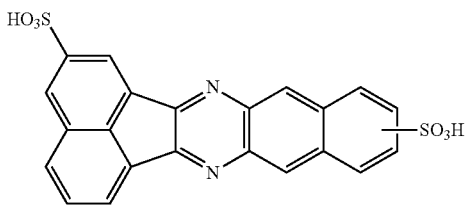

or salt thereof. This small molecule is referred to as acenaphtho[1,2-b]benzo[9]quinoxaline bisulfonic acid.

This birefringent small molecule can be synthesized as follows:

5.82 g of acenaphthoquinone (27.44 mmol) and 5.0 g of naphthalene-2,3-diamine (31.6 mmol) were added to 200 ml of acetic acid and the resulting suspension was stirred at room temperature for 6 hrs. Then the reaction mixture was filtered through fiberglass filter (D=80 mm) and filter cake was washed with 100 ml of acetic acid, then with 1000 ml of water and dried at 100-105° C. for 24 hrs. Yield of acenaphtho[1,2-b]benzo[9]quinoxaline was 8.7 g.

8.5 g of acenaphtho[1,2-b]benzo[9]quinoxaline was added to 60 ml of 30% oleum with agitation at <50° C. The reaction was heated to 75° C., agitated at temperature for 2 hours and then allowed to cool to room temperature.

132 ml of water was added with agitation at <50° C. and the resulting suspension agitated overnight.

Figure 16:
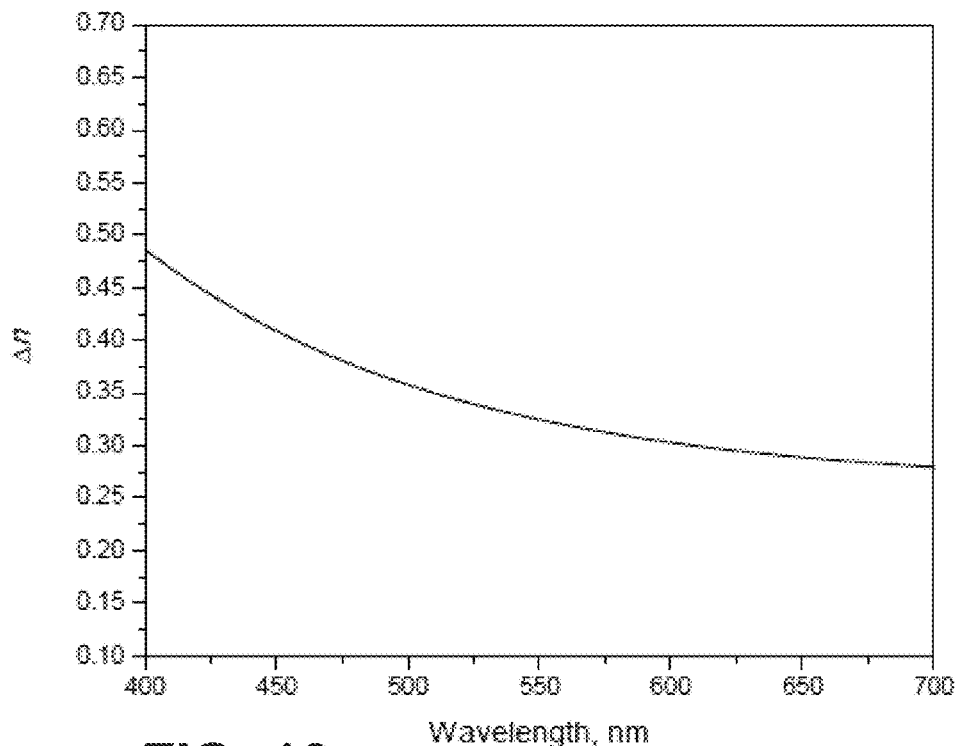
FIG. 16 is a graph illustrating the dispersion of in-plane anisotropy of a coating made of acenaphtho[1,2-b]benzo[9] quinoxaline bisulfonic acid.

Precipitated matter was isolated by filtration, washed with 1 L of glacial acetic then with 500 ml of acetone and air dried at 100-110° C. for 7 hrs. Yield of acenaphtho[1,2-b]benzo[9]quinoxaline bisulfonic acid was 13.2 g. An aqueous solution of this material was coated onto a glass substrate with a Mayer rod and dried. The dispersion of in-plane retardation of this coating was graphed and is illustrated in FIG. 16.

In many embodiments two or more of the birefringent small molecules described above can be combined to form a mixture of birefringent small molecules. As described above, a mixture of these birefringent small molecules can provide improved alignment properties. In some embodiments, 2(3)-sulfo-6,7-dihydrobenzimidazo[1,2-c]quinazoline-6-one-9(10)-carboxylic acid or salt thereof if combined with 4,4'-(5,5'-dioxidodibenzo[b,d]thiene-3,7-diyl)dibenzenesulfonic acid) or salt thereof to provide synergistic alignment properties.

Objects and advantages of this disclosure are further illustrated by the following examples, but the particular materials and amounts thereof recited in these examples, as well as other conditions and details, should not be construed to unduly limit this disclosure.

EXAMPLES

Example 1—Small Molecule on TAC, Hand Coating

Saponified TAC (triacetate cellulose) was used as a substrate. Primer (MICA A-131-X from Mica Corporation) was diluted to 2% solids by weight, in de-ionized ("DI") water and filtered through a nylon 0.45 micrometer filter. Primer was coated with the use of Mayer rod #1.5.

12% solution of the small molecule 4,4'-(5,5'-dioxidodibenzo(b,d)thiene-3,7-diyl)dibenzenesulfonic acid) was homogenized by stirring it for 20 min with a magnetic stirrer at 40 degrees C. Coating was done by Mayer rod #6 on top of the primed saponified TAC. Fresh coated layer was dried with a gentle stream of room temperature air with (flow rate 7-9 m/s) for 10 seconds.

Dried coating was passivated with the use of 10% $AlCl_3$ water solution. Typical passivation process is following. Coated substrate was dipped into the passivation solution for 5 seconds so that the entire coated area was submerged. Then the sample was dipped into DI water for 3 seconds. After that the sample was rinsed with a stream of DI water. Dried with compressed air with a flow rate of 30 m/s.

Figure 17:
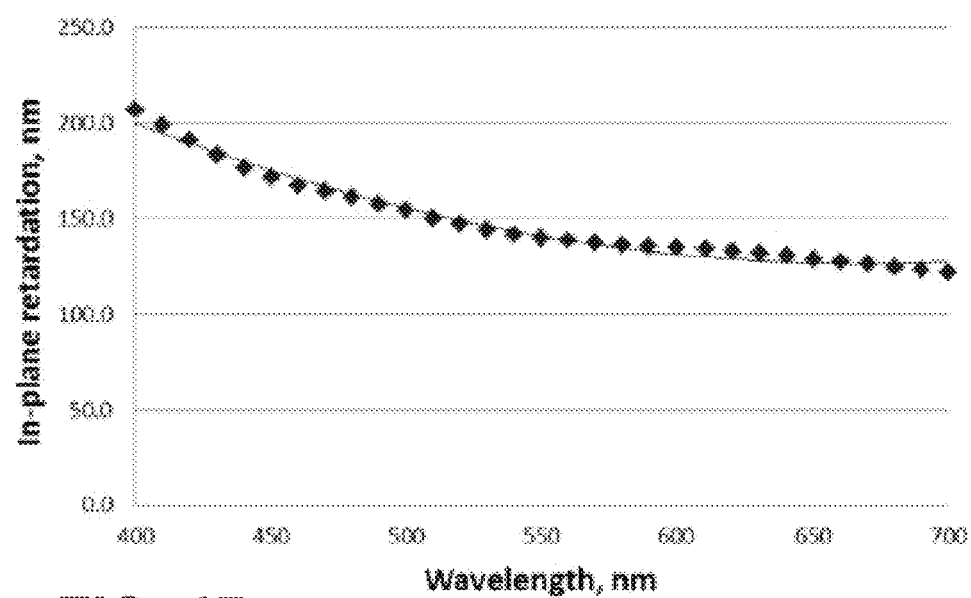
FIG. 17 is a graph illustrating the dispersion of in-plane retardation of Example 1.

Prepared samples were examined with the use of a polarimeter (Axometrics Axoscan). Retardation data was taken at normal incidence. The dispersion of in-plane retardation for this small molecule on TAC was graphed and is illustrated in FIG. 17. As it can be seen, this small molecule on TAC exhibits normal dispersion of retardation.

Example 2. Guest-Host on COP, Hand Coating

The small molecule 4,4'-(5,5'-dioxidodibenzo(b,d)thiene-3,7-diyl)dibenzenesulfonic acid and a polymer poly(2,2'-disulfo-4,4'-benzidine terephthalamide) were mixed in 83:17 weight ratio. Then the mixture was homogenized by stirring for 60 minutes on a magnetic stirring hot plate at 75 degrees C. Then the formulation was gradually cooled down to 35 degrees C. and brought to 12% solid concentration. Then the formulation was stirred for 20 minutes.

Half-wave COP (Zeon ZF45-270) was used as a substrate. The coatings were done in the machine (stretching) direction of the COP. The surface of COP was corona treated at a rate of 1 cm/s with hand held treater (Electro-technic Products, BD-20AC). COP was primed immediately after corona treatment as explained in Example 1.

Coating was done by Mayer rod #7 on top of the primed COP. Fresh coated layer was dried with a gentle stream of room temperature air with (flow rate 7-9 m/s) for 10 seconds.

Dried coating was passivated with the use of 10% AlCl$_3$ water solution. This passivation step is as follows: the coated substrate is dipped into the passivation solution for 5 seconds so that the entire coated area is submerged; then the sample is dipped into DI water for 3 seconds and rinsed with a stream of DI water; then the rinsed sample is dried with compressed air.

Figure 18:
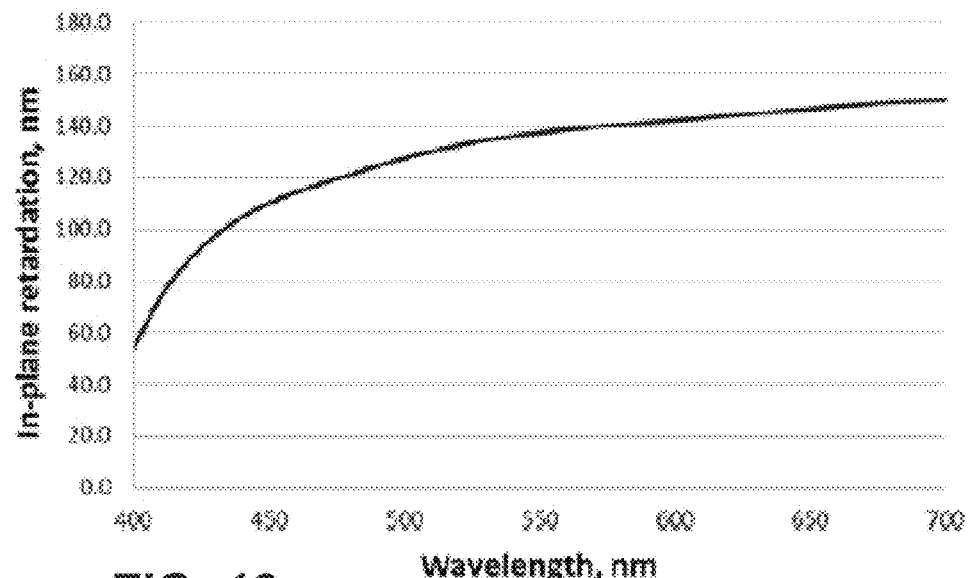
FIG. 18 is a graph illustrating the dispersion of in-plane retardation of Example 2.

Prepared samples were examined with the use of a polarimeter (Axometrics Axoscan). Retardation data was taken at normal incidence. The dispersion of in-plane retardation for this composition on COP was graphed and is illustrated in FIG. 18. Here a normal dispersion of retardation is subtracted from a constant retardation of COP, and results in an overall reverse dispersion property.

Example 3. Guest-Host on COP, Microgravure

A small molecule/polymer mixture was prepared as explained in Example 2.

Roll of half-wave COP (Zeon) was used as a substrate. The coatings was done in the machine direction of the COP. Coating was done in 3 runs.

First, a surface of the COP was corona treated. Second, COP was primed on Yasui Seiki MiniLabo microgravure machine with the use of 0.5% MICA (MICA A-131-X from Mica Corporation) primer solution under the following conditions: MG roll 90 LPI, web speed 2 m/min, roll rotation rate 20 rpm. Third, the mixture was applied on of the primed surface of COP using MG roll 90 LPI, web speed 1.5 m/min, roll rotation rate 15 rpm. Coating liquid was kept at 35 degrees C. during the coating process.

Drying was performed with inline heater-blower set to 40 degrees C. Dry coatings were cut into pieces and passivated as explained in Example 2.

Figure 19:
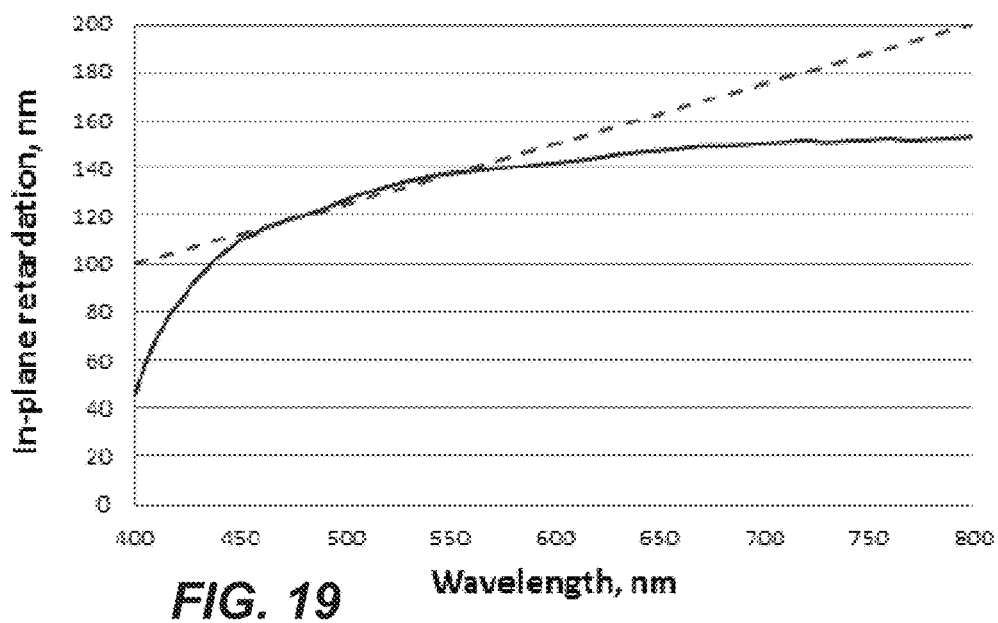
FIG. 19 is a graph illustrating the dispersion of in-plane retardation of Example 3 and a dotted ideal quarter-wave plot.

Prepared samples were examined with the use of a polarimeter (Axometrics Axoscan). Retardation data was taken at normal incidence. The dispersion of in-plane retardation for this composition on COP was graphed and is illustrated in FIG. 19. The ideal quarter-wave retarder plot is shown as a dashed line and the measured retardation plot is shown as a solid line. These two graphs in FIG. 19 illustrate that the Example 3 coating can be configured as a quarter-wave plate even though it is not an ideal quarter-wave retarder.

Example 4. Guest-Host on TAC Reverse Dispersion

Figure 20:
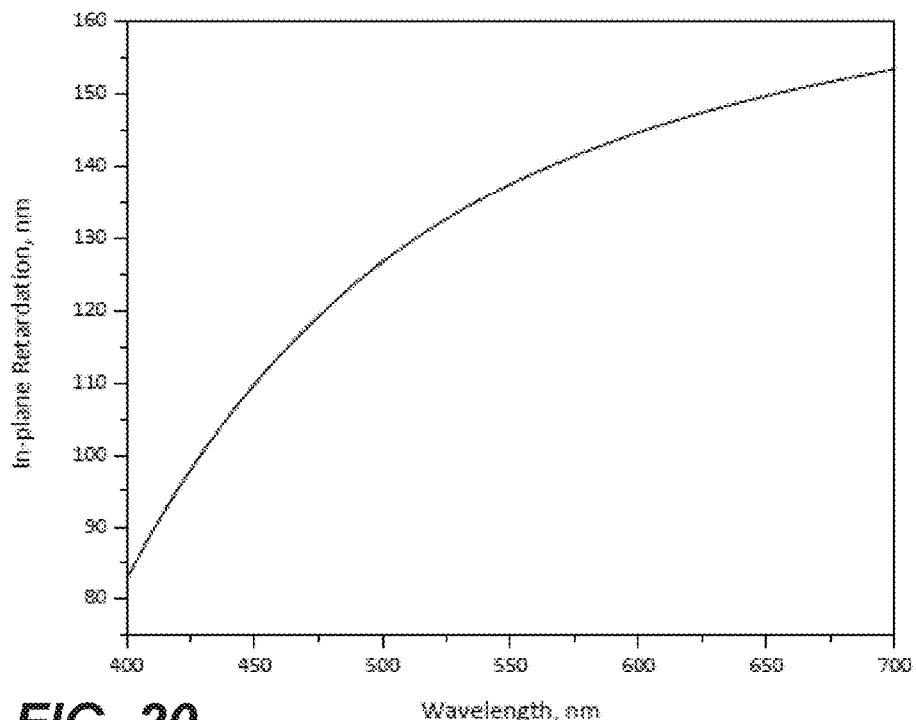
FIG. 20 is a graph illustrating the dispersion of in-plane retardation of Example 4.

An isotropic substrate (for example glass or TAC) was coated with a mixture of the small molecule acenaphtho(1,2-b)benzo(9)quinoxaline disulfonic acid and the polymer poly(monosulfo-p-xylene) in weight ratio of 24:76. Upon shear coating the mixture, both materials are ordered or aligned together such that the polymers are primarily aligned with an in-plane slow axis along the coating direction, and the small molecules are primarily aligned with an in-plane slow axis substantially orthogonal or substantially perpendicular to the coating direction. The coating had a thickness of 2200 nm and exhibited a calculated retardation of 140 nm (at 550 nm) and reverse dispersion. A calculated model graph of this system is illustrated in FIG. 20.

Example 5. Guest-Host on TAC Flat Dispersion

Figure 21:
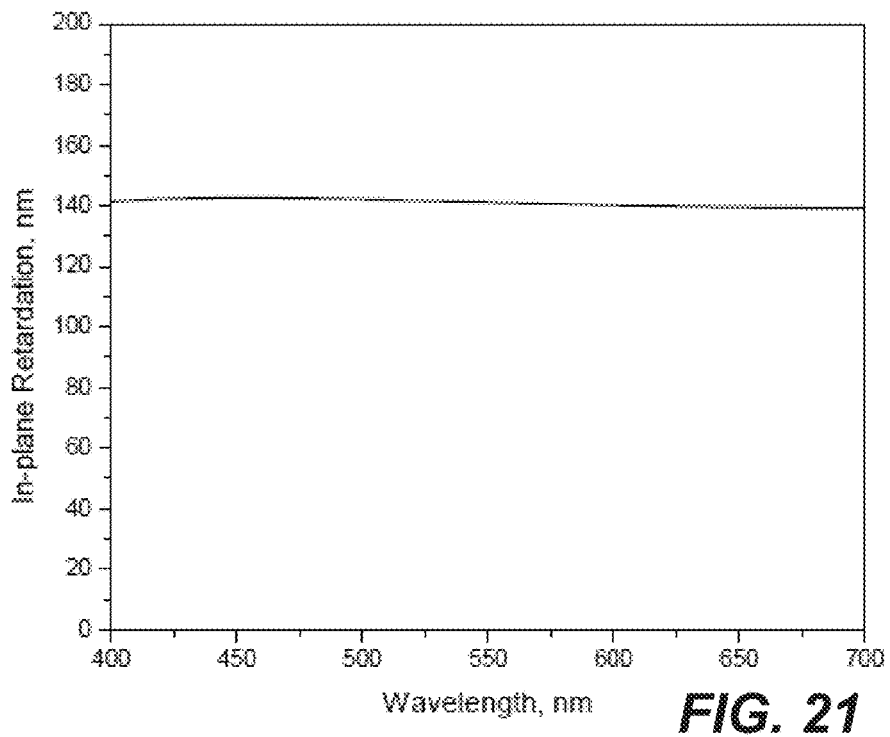
FIG. 21 is a graph illustrating the dispersion of in-plane retardation of Example 5.

An isotropic substrate (for example glass or TAC) was coated with a mixture of a small molecule 4,4'-(5,5'-dioxidodibenzo(b,d)thiene-3,7-diyl)dibenzenesulfonic acid and the polymer poly(monosulfo-p-xylene) in weight ratio of 10:90. Upon shear coating both materials are ordered or aligned together such that the polymers are primarily aligned with the in-plane slow axis along the coating direction, and the small molecules are primarily aligned with slow axis substantially orthogonal or substantially perpendicular to the coating direction. The coating had a thickness of 1200 nm and exhibited a calculated retardation of 140 nm (at 550 nm) and flat dispersion of retardation. A calculated model graph of this system is illustrated in FIG. 21.

Thus, embodiments of POLYMER-SMALL MOLECULE FILM OR COATING HAVING REVERSE OR FLAT DISPERSION OF RETARDATION are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A retarder comprising:
    a layer having a thickness of less than 5 micrometers and comprising a mixture comprising birefringent small molecules and birefringent polymers having a weight ratio of birefringent polymer:birefringent small molecule in a range from 70:30 to 90:10, the birefringent polymers having an in-plane slow axis primarily in a first direction and the birefringent small molecules having an in-plane slow axis substantially orthogonal to the first direction; wherein:
    the layer exhibits in-plane retardation values that vary by +/−5% or less in the entire wavelength range from 400 to 700 nanometers or the retarder exhibits an in-plane retardation that increases as a function of wavelength in a wavelength range of 400 to 700 nanometers; and
    the mixture comprises the following birefringent small molecules of the following formula:

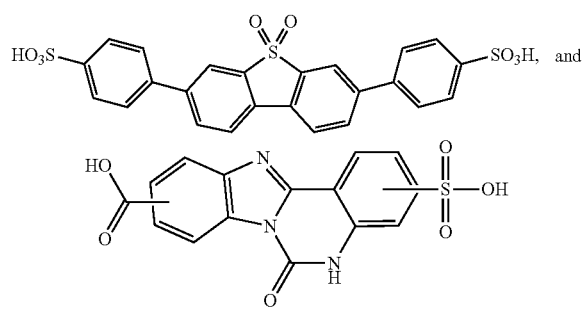

or salts thereof.

2. The retarder according to claim 1, wherein the layer exhibits an in-plane retardation that increases as a function of wavelength for the entire wavelength range of 400 to 700 nanometers.

3. The retarder according to claim 1, wherein the layer exhibits in-plane retardation values that vary by +/−3% or less in the entire wavelength range from 400 to 700 nanometers.

4. The retarder according to claim 1, further comprising an isotropic substrate contacting the layer.

5. The retarder according to claim 1, wherein the layer has a thickness in a range from 1 to 5 micrometers.

6. The retarder according to claim 1, wherein the retarder is configured as an achromatic quarter-wave plate.

7. The retarder according to claim 1, wherein at least some of the birefringent polymers have a formula:

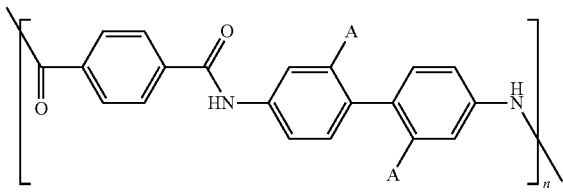

wherein,
A is independently selected from $SO_3H$ or COOH, or their salt of an alkali metal, ammonium, quaternary ammonium, alkali earth metal, $Al^{3+}$, $La^{3+}$, $Fe^{3+}$, $Cr^{3+}$, $Mn^{2+}$, $Cu^{2+}$, $Zn^{2+}$, $Pb^{2+}$ or $Sn^{2+}$; and
n is an integer from 10 to 10,000.

8. The retarder according to claim 1, wherein at least some of the birefringent polymers have a formula:

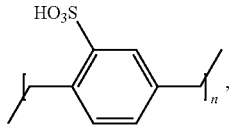

or salt thereof,
wherein n is an integer in a range from 25 to 10,000.

9. A multifunctional optical film comprising the retarder according to claim 1 disposed on a polarizer.

10. An optical film stack comprising a polarizer, the retarder according to claim 1, and an optical film.

11. A display comprising the retarder according to claim 1.

12. The retarder according to claim 1, wherein the layer is disposed on an anisotropic substrate.

13. The retarder according to claim 1, wherein the layer is disposed on a cyclic-olefin polymer (COP) substrate.

* * * * *